July 4, 1950     B. E. O'CONNOR     2,514,139
TORSIONAL VIBRATION DAMPER
Filed Feb. 24, 1947     2 Sheets-Sheet 1
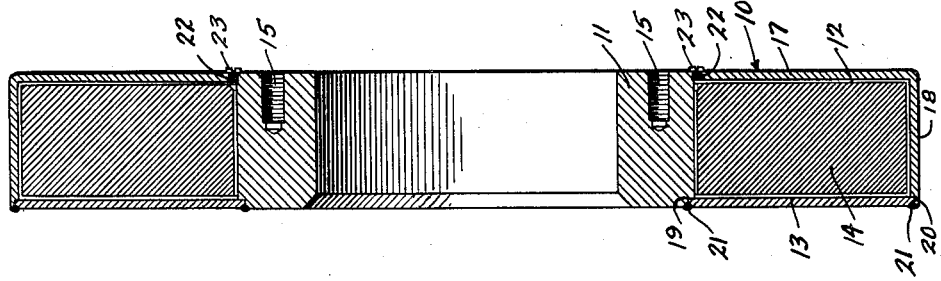
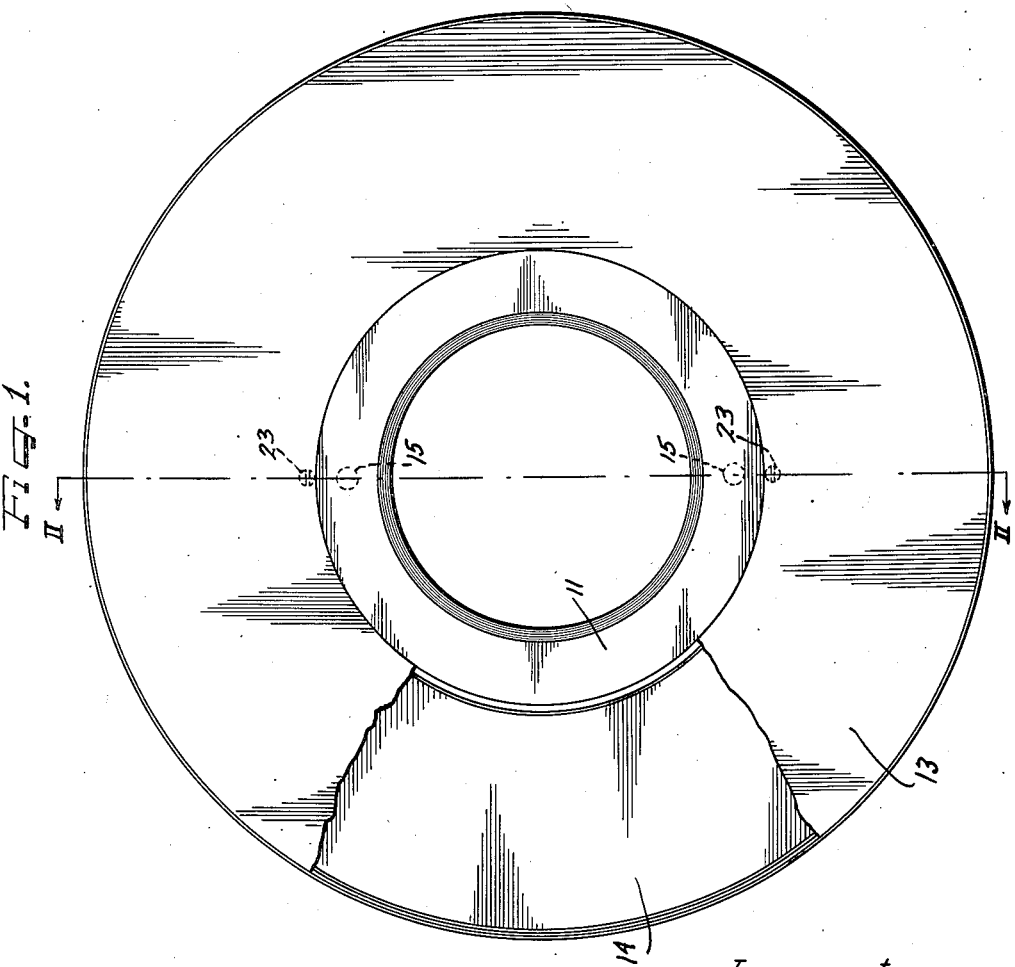
Inventor
BERNARD E. O'CONNOR

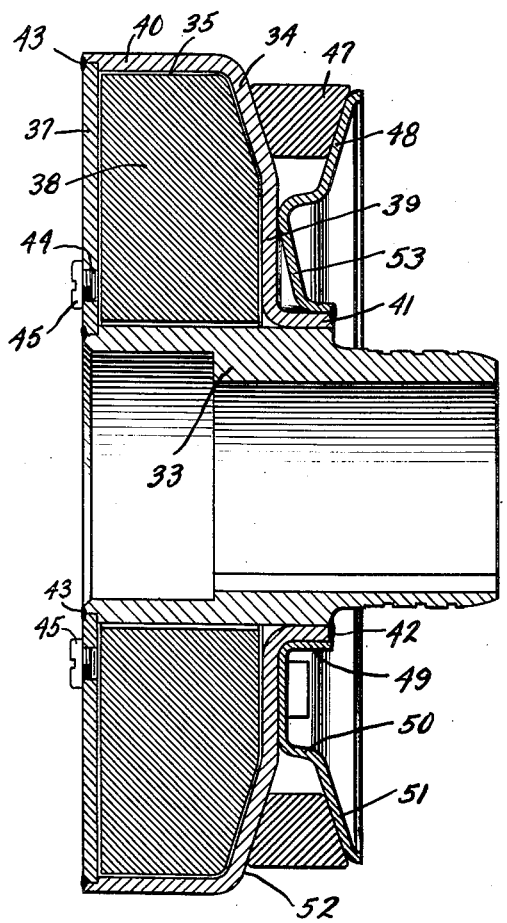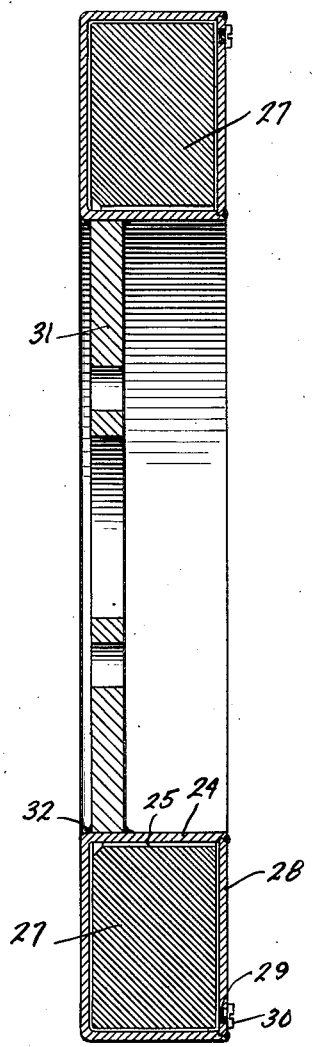

Patented July 4, 1950

2,514,139

UNITED STATES PATENT OFFICE 2,514,139

TORSIONAL VIBRATION DAMPER

Bernard E. O'Connor, Buffalo, N. Y., assignor to Houdaille-Hershey Corporation, Detroit, Mich., a corporation of Michigan Application February 24, 1947, Serial No. 730,434

5 Claims. (Cl. 74—574)

This invention relates to improvements in vibration dampers and is more especially directed to flywheel type dampers for overcoming torsional oscillations or vibrations in rotary masses such as crankshafts.

An important object of the present invention is to provide an improved torsional vibration damper of the type wherein the shear resistance of a viscous fluid between the closely spaced opposing surfaces of a flywheel and a flywheel casing is relied upon as a yieldable coupling for the flywheel and casing.

Another object of the invention is to improve the construction of such torsional vibration dampers to render the same substantially fully self-adjustable with respect to the operative components.

A further object of the invention is to improve the construction of vibration dampers to effect substantial economies in manufacturing costs.

Yet another object of the invention is to provide a torsional vibration damper of improved efficiency yet simplified construction and lower cost.

Other objects, features and advantages of the present invention will be readily apparent from the following description of certain preferred embodiments thereof taken in conjunction with the accompanying drawings, in which:

Figure 1 is a front elevational view of a torsional vibration damper embodying features of the invention and with a certain portion thereof broken away to reveal certain details of structure;

Figure 2 is a diametrical sectional view through the damper of Figure 1, taken substantially on line II;

Figure 3 is a diametrical sectional view through a modified form of the damper; and Figure 4 is a diametrical sectional view through a further modified form of the damper.

In all forms of the damper, a high inertia damping mass in the form of a flywheel is housed within a casing, the walls of which are in close proximity to the opposing walls of the flywheel, and a viscous fluid, such as a silicone intervening between the casing and the flywheel affords a yieldable coupling due to its drag and shear resistance tending to restrain relative motion, and especially high speed motion between the flywheel and the casing.

Whereas it has heretofore been deemed essential to afford a bearing at the inner diameter of the flywheel to maintain the flywheel concentric with the axis of the damper, I have discovered that improved results are attained where the inside diameter of the flywheel is clear of the opposing hub or wall of the casing and the flywheel is substantially free floating within relatively close limits in the casing.

Accordingly, in the practical embodiment of the invention shown in Figures 1 and 2, a damper casing 10 which may be a casting includes an annular hub 11 and is formed with a relatively deep groove 12 providing an annular chamber opening at one side in the direction of the axis of the damper. The chamber 12 is closed by a cover 13 and has assembled therein a flywheel ring 14. This damper structure is adapted for heavy duty use such as on the crankshafts of Diesel engines and the hub 11 is therefore of fairly massive form and adapted to be pressed onto a crankshaft. Tapped bores 15 at one side of the hub preferably on the side opposite the opening to the flywheel chamber 12, are adapted for attachment of a puller for removing the damper from the crankshaft when necessary.

The walls of the casing 10 defining the flywheel chamber 12, and identified as a side wall 17 and a peripheral wall 18, are relatively thin and may be formed integral with the hub 11. The cover 13 may be merely a ring-shaped plate of approximately the same thickness as the walls 17 and 18 and in the final assembly may be set into appropriate inner and outer rabbet grooves 19 and 20, respectively, and welded as indicated at 21 into permanent fluid sealed relation substantially flush with the front side of the damper casing.

Within the flywheel chamber 12, the flywheel 14 is confined to very narrow clearance with respect to the opposing surfaces of the casing at the sides of the flywheel as well as the outer periphery. Somewhat greater clearance is provided between the inner periphery of the flywheel and the hub of the casing.

In other words, the flywheel 14 is free floating within the chamber 12 within the relatively close limits permitted by the very narrow side and outer peripheral clearance.

The small space left within the casing 10 is filled as completely as practicable with viscous fluid such as a silicone having a high shear and compression resistance, there being enough air left in the unit to allow for expansion of the viscous fluid under high operating temperatures. Appropriate small filler openings 22 are provided which are thoroughly sealed by filler plugs 23 after filling.

It will be understood, of course, that although as illustrated the flywheel 14 is shown substantially perfectly centered with respect to the chamber 12, where the damper is idle there will be gravational tendency of the flywheel to rest against the lowermost peripherally opposing surface of peripheral wall 18 of the casing.

The overall clearance between the inner periphery of the flywheel 14 and the hub 11 is preferably such that the center periphery of the flywheel remains at all times free of the hub. This is advantageous in avoiding bearing engagement between the flywheel and hub and thus eliminating the problem of lubrication in this region, and also in providing a reserve fluid and air chamber and expansion chamber.

To improve the shear resistance qualities of the thin film of the viscous fluid which substantially fills the spaces between the flywheel and the casing, the spacing between the outer peripheral and the side surfaces of the flywheel and the casing are substantially equal. Thus, during slow revolutions of the damper, the flywheel and the casing will revolve substantially together by reason of the lubricated bearing relation therebetween. At such low speeds the vibrations are of relatively low magnitude and the viscous fluid acting as a lubricant between the contacting surfaces of the flywheel and the housing may permit some relative displacement of the flywheel and casing with only low order vibration damping from frictional resistance of the lubricated bearing surfaces.

At high speeds, of course, the viscous fluid becomes more and more resistant to relative movement of the flywheel and casing and under centrifugal force acts to equalize the peripheral and side spacings between the flywheel and the casing, thus affording substantially uniform shear films in such spaces. This provides a relatively strongly fluid coupling between the flywheel and the casing which is highly resistant to either relative rotary or axial movement of the flywheel and casing and thereby operates with high efficiency in damping torsional as well as to a certain extent axial vibration in the associated shaft or other rotating mass with which the damper is operatively related.

The substantial peripheral area about the flywheel 14 and the very large areas at the sides of the flywheel present highly efficient shear film surfaces.

Operationally the modified form of the invention shown in Figure 3 is much the same as the form already described, but certain structural differences are present which may be found advantageous for certain purposes. Accordingly, this damper includes a casing 24 which may be formed from sheet metal shaped to annular, sidewise-opening U-shaped cross-sectional form to provide a chamber 25. Within this chamber is a ring-shaped flywheel 27 proportioned to afford only small clearance between the various surfaces thereof opposing the casing. After the flywheel 27 has been assembled within the casing, the outer side of the casing is permanently closed by means of an inset ring disk cover 28 which may be welded in place substantially as shown. Openings 29 may be formed in the cover 28 for filling the flywheel chamber 25 with viscous fluid, and such openings are closed by means of plugs 30.

The hub for the damper is provided by the integral inner side of the sheet metal annulus to which means such as a mounting ring disk 31 of substantial thickness may be secured as by means of welding 32 to provide a flange on the inner periphery of the casing 24. Where practicable, of course, the mounting ring disk may be formed as an integral part of the sheet metal stamping of the casing 24 by forming the inner lip thereof as a radially inward mounting flange.

The form of the invention shown in Figure 4 is especially adapted for dampening vibrations in crankshafts of internal combustion engines where a fan drive or belt-like pulley is required. In this form a hub 33 carries a casing member 34 providing a flywheel chamber 35 initially open at one side but closed by means of an inset ring plate 37 after a flywheel 38 is assembled within the chamber. The casing member 34 comprises a sheet metal stamping having a side wall 39 and an annular flange-like outer peripheral wall 40 while an axially oppositely extending inner marginal annular flange 41 affords an embracing abutment about the hub 33 and is preferably welded thereto as indicated at 42. The inset closure plate 37 is preferably flush with the edge of the peripheral wall flange 40 and the end of the hub 33 and permanently secured in place as by means of welding 43. Filler openings 44 in the plate 37 are closed by filler plugs 45.

The flywheel 38 functions similarly as the flywheels in the other forms of dampers disclosed and is entirely free floating, with the various surfaces thereof closely spaced with respect to all opposing surfaces within the chamber 35. In this way maximum shear resistance efficiency is attained in the operation of the damper.

In order to accommodate a drive belt 47, a pulley flange disk 48 is attached to the casing 34. An inner marginal generally axially extending flange 49 on the pulley disk embraces the casing attachment flange 41 and is welded thereto by the welding 42. From the flange 49, the pulley flange extends generally radially in contact with the casing wall 39 to approximately half its diameter where an axial offsetting bend 50 affords a spacing merger with a generally frusto-conically-shaped belt-engaging outer flange portion 51. Complementary to the flange portion 51, the casing wall 39 is formed with a beveled portion 52 whereby a pulley groove is defined for receiving the belt 47. The body portion of the pulley flange disk is preferably reinforced by generally radially extending reinforcing ribs 53.

In all forms of the invention, it will be observed, the damping mass or flywheel is entirely free floating and self-centering and is thus capable of adjusting itself to substantial manufacturing tolerances. This is an important factor in reducing manufacturing costs not only because it eliminates the need for close machining but also because it enables the use of materials and manufacturing expedients which are not possible with dampers where the flywheel is held to a close rotary path by means of bearings or the like. Thus, as disclosed in the forms of Figures 3 and 4, the housing for the flywheel may be formed from sheet metal stampings, which eliminates expensive machining operations as are demanded in the shaping of castings or forgings.

By the elimination of any bearings for the flywheel a substantial item of cost is saved, so that the dampers can be produced at a reduced cost.

By having the side and outer peripheral surfaces of the flywheel spaced approximately equally from the opposing surfaces of the casing, a high rate of efficiency is obtained due to the large areas of viscous film shear resistance afforded.

Although ring-type flywheels have been shown, the flywheels could just as well be solid or imperforate disks, where the casings are formed without hubs.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a vibration damper, a flywheel ring, a housing adapted to be secured to a rotary mass to be damped and having an annular chamber therein of overall dimensions of such close clearance relative to the entire opposing areas of the flywheel that during high speed rotation of the housing the flywheel is, in effect, free floating within close limits in the chamber, and a viscous coupling fluid of high sheer resistance in the clearances between the flywheel and the housing, the inner peripheral diameter of the flywheel ring being sufficiently greater than the diameter of the opposing inner annular wall of the chamber to permit the outer periphery of the flywheel to rest against the opposing outer peripheral wall of the chamber in the slow speed or at rest conditions of the damper.

2. In combination in a torsional vibration damper, a ring-shaped flywheel mass, and a housing arranged to be secured fixedly to a shaft subject to torsional vibrations which are to be damped, the housing having a hub portion and defining an annular chamber about said hub portion; completely enclosing the flywheel mass and being adapted to contain a viscous coupling liquid of relatively high sheer resistance, the clearance between the opposing axially facing surfaces and between the opposing peripheral surfaces of the flywheel mass and the housing being quite close and providing only thin shear film spacing therebetween in the substantially uniformly spaced relation between the flywheel mass and the opposing surfaces of the housing, the flywheel mass being free in the non-operating condition of the damper to move radially and axially within the limits permitted by said axial and peripheral clearance spacing between the flywheel mass and the housing and being maintained in operation in centered spaced relation in the housing by the action of the coupling fluid under centrifugal force developing fluid coupling and flywheel mass and housing spacing shear films between the opposed axially facing and peripheral surfaces of the flywheel and the housing to effect joint rotation thereof and resisting relative rotation as well as maintaining the operational spaced relation between the flywheel mass and the opposing surfaces of the housing.

3. In a vibration damper, a flywheel ring, a casing comprising an annular sheet metal structure of sidewardly opening U-shaped cross section and having a ring plate closing the open side thereof to provide a fluid tight annular chamber, the casing being adapted to be secured to a rotary mass to be damped, said flywheel ring being housed within the annular chamber defined within the casing, the overall dimensions of the interior of the chamber and of the flywheel ring relative to all of the opposing areas thereof being such that during high speed rotation of the casing the flywheel ring is, in effect, free floating within close limits in the chamber, and a viscous coupling fluid of high shear resistance in the clearances between the flywheel and the casing, the inner peripheral diameter of the flywheel ring being sufficiently greater than the diameter of the opposing inner annular wall of the chamber to permit the outer periphery of the flywheel to rest against the opposing outer peripheral wall of the chamber in the slow speed or at rest conditions of the damper.

4. In a vibration damper, a flywheel ring, a casing comprising an annular sheet metal structure of sidewardly opening U-shaped cross section and having a ring plate closing the open side thereof to provide a fluid tight annular chamber, the casing being adapted to be secured to a rotary mass to be damped, said flywheel ring being housed within the annular chamber defined within the casing, the overall dimensions of the interior of the chamber and of the flywheel ring relative to all of the opposing areas thereof being such that during high speed rotation of the casing the flywheel ring is, in effect, free floating within close limits in the chamber, and a viscous coupling fluid of high shear resistance in the clearances between the flywheel and the casing, the inner peripheral diameter of the flywheel ring being sufficiently greater than the diameter of the opposing inner annular wall of the chamber to permit the outer periphery of the flywheel to rest against the opposing outer peripheral wall of the chamber in the slow speed or at rest conditions of the damper, said casing having a rigid hub member secured to the inner peripheral wall thereof and by which the casing is adapted to be secured to the rotary mass to be damped.

5. In a vibration damper, a flywheel ring, a housing adapted to be secured to a rotary mass to be damped and having an annular chamber therein of overall dimensions of such close clearance relative to the entire opposing areas of the flywheel that during high speed rotation of the housing the flywheel is, in effect, free floating within close limits in the chamber, and a viscous coupling fluid of high shear resistance in the clearances between the flywheel and the housing, the inner peripheral diameter of the flywheel ring being sufficiently greater than the diameter of the opposing inner annular wall of the chamber to permit the outer periphery of the flywheel to rest against the opposing outer peripheral wall of the chamber in the slow speed or at rest conditions of the damper, said housing having a pulley flange secured at one side thereof and cooperating therewith to provide a pulley groove for reception of a drive belt.

BERNARD E. O'CONNOR.

REFERENCES CITED

The following references are of record in the file of this patent:

UNITED STATES PATENTS

| Number | Name | Date |
| --- | --- | --- |
| 1,928,119 | Vargha | Sept. 26, 1933 |
| 2,013,109 | Reynolds | Sept. 3, 1935 |

FOREIGN PATENTS

| Number | Country | Date |
| --- | --- | --- |
| 337,466 | Great Britain | Nov. 3, 1930 |
| 349,906 | Great Britain | May 26, 1931 |
| 508,513 | Great Britain | July 3, 1939 |